United States Patent
Sim

(10) Patent No.: US 9,517,793 B2
(45) Date of Patent: Dec. 13, 2016

(54) METHOD OF PREVENTING OVER STROKE IN REAR-WHEEL STEERING SYSTEM AND LINEAR SENSOR APPLIED THERETO

(71) Applicant: MANDO CORPORATION, Pyeongtaek-si, Gyeonggi-do (KR)

(72) Inventor: Gyung Hun Sim, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 14/740,935

(22) Filed: Jun. 16, 2015

(65) Prior Publication Data

US 2015/0367882 A1 Dec. 24, 2015

(30) Foreign Application Priority Data

Jun. 18, 2014 (KR) ........................ 10-2014-0074562

(51) Int. Cl.
*B62D 15/02* (2006.01)
*B62D 7/15* (2006.01)
*B62D 5/04* (2006.01)
*G01D 5/12* (2006.01)
*G01D 5/14* (2006.01)

(52) U.S. Cl.
CPC ........... *B62D 7/1581* (2013.01); *B62D 5/0469* (2013.01); *G01D 5/145* (2013.01)

(58) Field of Classification Search
CPC ............. B62D 5/04; B62D 6/00; B62D 15/02; G01D 5/12; G01D 5/145; G01B 7/00
USPC ............................................... 701/43, 41, 36
See application file for complete search history.

(56) References Cited

U.S. PATENT DOCUMENTS

| 4,875,541 | A | * | 10/1989 | Oshita | B62D 5/0463 180/446 |
|---|---|---|---|---|---|
| 5,267,627 | A | * | 12/1993 | Frank | B62D 5/008 180/422 |
| 6,381,527 | B1 | * | 4/2002 | Furumi | B62D 5/0433 180/445 |
| 6,408,235 | B1 | * | 6/2002 | Tanke, II | B62D 5/0469 180/443 |
| 8,082,078 | B2 | * | 12/2011 | Wittig | B62D 5/0457 180/446 |
| 8,869,930 | B2 | * | 10/2014 | Ishihara | B62D 5/001 180/446 |
| 8,977,437 | B2 | * | 3/2015 | Tamaizumi | B62D 5/0469 180/443 |
| 2012/0232754 | A1 | * | 9/2012 | Champagne | B62D 5/0469 701/41 |

FOREIGN PATENT DOCUMENTS

KR  1019990030956 A  4/2000

* cited by examiner

*Primary Examiner* — Tan Q Nguyen
(74) *Attorney, Agent, or Firm* — Hauptman Ham, LLP

(57) ABSTRACT

The present invention relates to a method of preventing over stroke in a rear-wheel steering system for a vehicle, and more particularly, to a method of preventing the over stroke of a lead screw using a linear sensor moving together with the lead screw in a rear-wheel steering system. In detail, there is provided a method of preventing over stroke in a rear-wheel steering system, including determining whether a linear sensor which moves in conjunction with a lead screw enters preliminary sections A of a stroke section a and restricting the movement of the lead screw when the linear sensor enters the preliminary sections A.

10 Claims, 6 Drawing Sheets

METHOD OF PREVENTING OVER STROKE IN REAR-WHEEL STEERING SYSTEM AND LINEAR SENSOR APPLIED THERETO

CROSS-REFERENCE TO RELATED APPLICATION

This application claims priority to and the benefit of Korean Patent Application No. 10-2014-0074562, filed on Jun. 18, 2014, the disclosure of which is incorporated herein by reference in its entirety.

BACKGROUND

1. Field of the Invention

The present invention relates to a method of preventing over stroke in a rear-wheel steering system for a vehicle and a linear sensor applied thereto, and more particularly, to a method of preventing over stroke of a lead screw using a linear sensor moving together with the lead screw in a rear-wheel steering system.

2. Discussion of Related Art

Generally, a steering system for a vehicle is a system which allows a driver to change a driving direction of the vehicle at will, which assists the driver to arbitrarily change the center of rotation of the front wheels of the vehicle to drive the vehicle in a direction that the driver wants.

A power-assisted steering system of a vehicle is an apparatus which allows a driving direction of the vehicle to be easily changed using a smaller force by assisting a force of a driver to operate a steering wheel of the vehicle through a boost power device when the driver operates the steering wheel.

In contrast to a front-wheel steering system, a rear-wheel steering system performs control using a communication method such as a controller area network (CAN) without a steering wheel. A lead screw connected to a motor in the rear-wheel steering system and able to change a toe angle of the rear wheels by converting the rotary motion of the motor into linear motion moves left and right in a certain area inside a housing which accommodates the motor.

When the driver changes a steering angle through a step while driving, a target position value of the rear-wheel steering system is operated through the step. Here, depending on settings of a decelerator and controller of the rear-wheel steering system, the motor operates at a high speed of about 1,000 to 3000 rpm. Due to inertia occurring herein, overshooting may occur in the motor. Due to the overshooting of the motor, the lead screw connected to the motor impacts an end of one side of the area in which the lead screw moves left and right, thereby damaging the system by fire. Also, noise generated by impacts hinders the driver's comfort.

PRIOR ART DOCUMENT

[Patent Document]
Korean Patent Publication Application No. 1999-0030956

SUMMARY OF THE INVENTION

The present invention is directed to a method of preventing over stroke in a rear-wheel steering system, which is capable of preventing a lead screw from being out of a controllable range of the rear-wheel steering system.

The present invention is also directed to a method of preventing over stroke in the rear-wheel steering system, which is capable of allowing a lead screw to return to a controllable area of the rear-wheel steering system when the lead screw is out of the controllable area.

The present invention is also directed to a method of preventing over stroke in a rear-wheel steering system, which is capable of controlling a lead screw by indirectly detecting whether the lead screw is in a controllable area in a left-right movement area.

The present invention is also directed to a method of preventing over stroke in a rear-wheel steering system, which is capable of improving the accuracy of detecting a position of a lead screw by increasing the resolution of an output signal of a linear sensor.

According to an aspect of the present invention, there is provided a method of preventing over stroke in a rear-wheel steering system, including determining whether a linear sensor which moves in conjunction with a lead screw enters preliminary sections A of a stroke section a (S1) and restricting the movement of the lead screw when the linear sensor enters the preliminary sections A (S2).

The method may further including determining whether the linear sensor moves beyond the preliminary sections A and enters over stroke sections b and c (S3) and switching a moving direction of the lead screw when the linear sensor enters the over stroke sections b and c (S4).

The linear sensor may have a first sensor output and a second sensor output, and a controller may use a difference between the first sensor output and the second sensor output in the determining of entry (S1, S3).

In the restricting of the movement (S2), a controller may reduce a speed of a motor connected to the lead screw.

In the restricting of the movement (S2), a controller may reduce the current supplied to a motor connected to the lead screw.

In the converting of the moving direction (S4), a controller may change a polarity of the current supplied to a motor connected to the lead screw.

According to another aspect of the present invention, there is provided a linear sensor including a housing (100) including an accommodation space therein, a mobile member (120) which is provided in the accommodation space, at least a part thereof extending outside the housing 100 and connected to a mounting unit, interworks with a lead screw, and moves left and right in a stroke section a, a magnet member (122) provided in the mobile member 120 and configured to generate a magnetic force, and an output unit (110) configured to sense a position of the magnet member 122 and to generate a first sensor output and a second sensor output.

When the mobile member 120 enters preliminary sections A in the stroke section a, the movement of the lead screw may be restricted.

When the mobile member 120 moves beyond the preliminary sections A and enters over stroke sections b and c, a moving direction of the lead screw may be switched.

A position of the mobile member 120 may be sensed based on a difference between the first sensor output and the second sensor output.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1A is a perspective view of the rear-wheel steering system and FIG. 1B is an enlarged view of a linear sensor mounting unit shown in FIG. 1A;

DETAILED DESCRIPTION OF EXEMPLARY EMBODIMENTS

Figure 1:
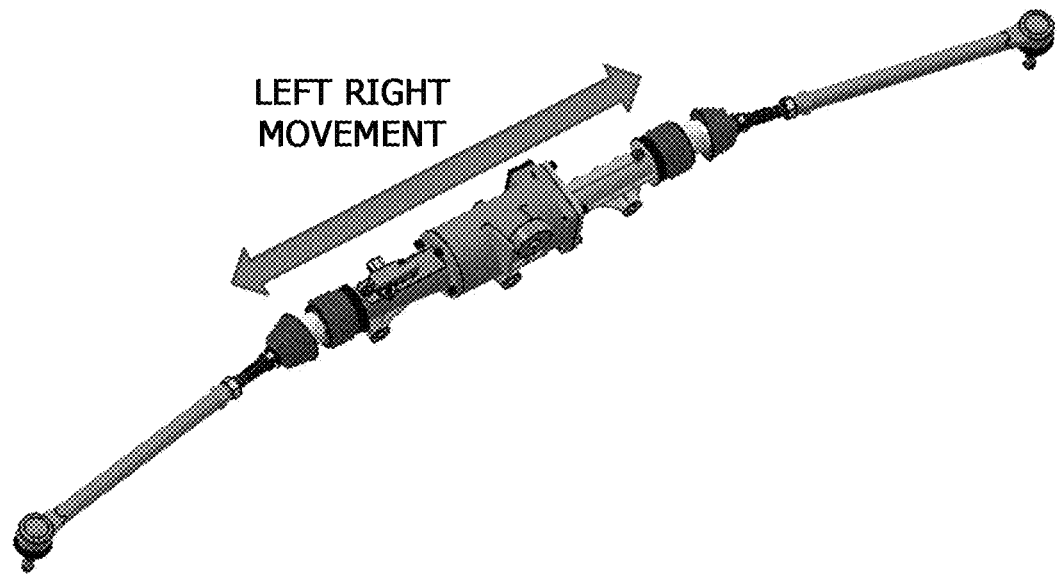
FIG. 1 is a view illustrating a rear-wheel steering system according to one embodiment of the present invention where
Figure 1:
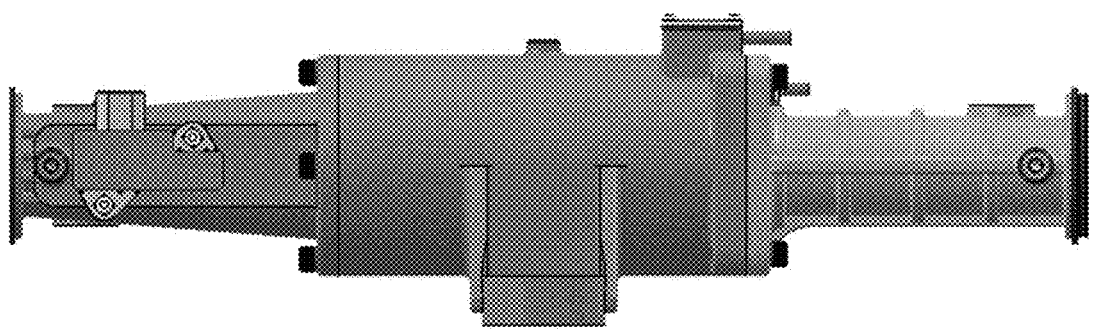

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a method of preventing over stroke in a rear-wheel steering system and a linear sensor applied thereto according to exemplary embodiments of the present invention will be described with reference to the attached drawings. Throughout the drawings, while assigning reference numerals to elements, even when shown in different drawings, like reference numerals designate like elements. While describing the embodiments, when it is determined that a detailed description of components or functions well known in the art may unnecessarily obscure the points of the present embodiment, the detailed description thereof will be omitted.

FIG. 1A is a perspective view of a rear-wheel steering system according to one embodiment of the present invention. FIG. 1B is an enlarged view of a linear sensor mounting unit shown in FIG. 1A.

As shown in FIG. 1A, the rear-wheel steering system according to the embodiment of the present invention is disposed to extend in a direction of a width of a vehicle and connected to each of the rear wheels. The rear-wheel steering system described above may move left and right to change a toe angle of the rear wheels according to a control signal of a controller.

In detail, inside the rear-wheel steering system, a motor is installed in an appropriate portion of a car body along the direction of the width of the vehicle while being accommodated in a housing. A motor shaft is installed and extends left and right along an axial direction of the vehicle. When a rotor of the motor rotates, a lead screw formed coaxially with the motor shaft moves left and right in a controllable area in the housing which accommodates the motor, thereby changing the toe angle of the rear wheels.

A linear sensor mounting unit shown in FIG. 1B includes a linear sensor in a cylindrical portion of a bottom end in the drawing. In the embodiment of the present invention, the linear sensor (refer to FIG. 2) connected to the linear sensor mounting unit moves in conjunction with left and right movements of the rear-wheel steering system.

Figure 2:
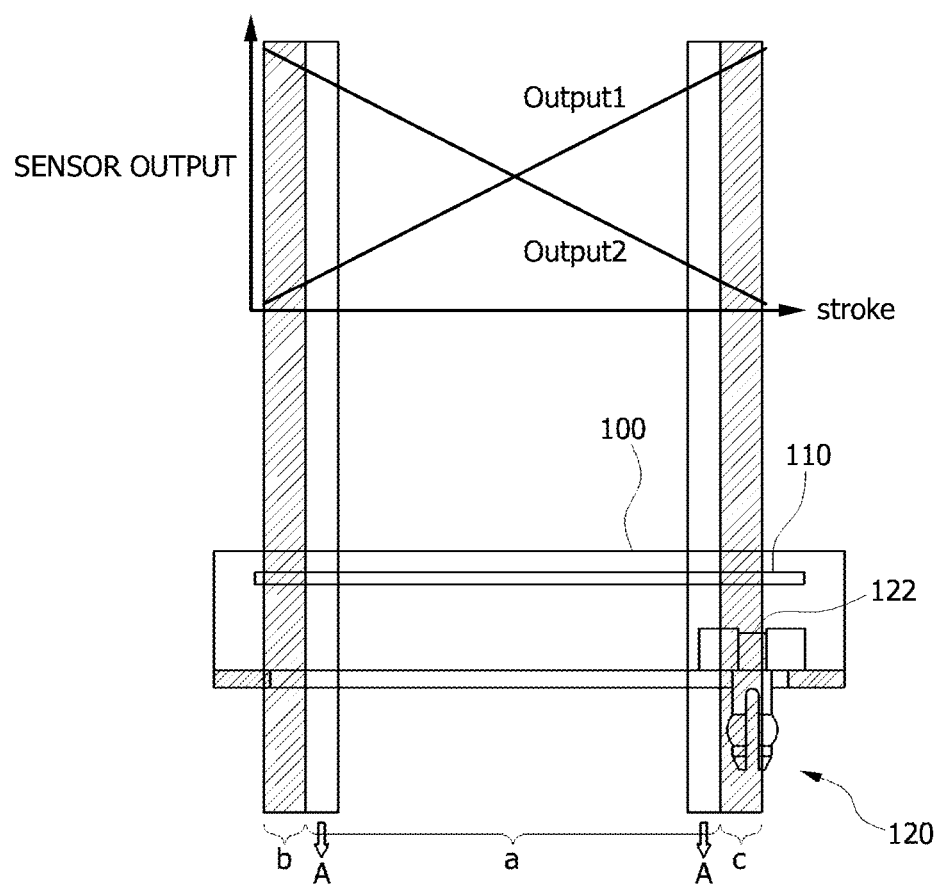
FIG. 2 illustrates a cross section of a linear sensor according to one embodiment of the present invention and a graph illustrating a stroke section and over stroke sections of the linear sensor.

FIG. 2 illustrates a cross section of the linear sensor according to one embodiment of the present invention and a graph illustrating a stroke section and over stroke sections of the linear sensor.

Referring to FIG. 2, the linear sensor includes an output unit 110, a magnet member 122, and a mobile member 120 included in a housing 100.

The output unit 110 is provided in an accommodation space of the housing 100 and generates a sensor output by sensing a position of the magnet member 122. The sensor output, as shown in FIG. 2, includes two types such as a first sensor output and a second sensor output. The first sensor output and the second sensor output display maximum values at mutually opposite positions of the magnet member 122 in the housing 100.

The output unit 110 may transmit the sensor output to the controller. The controller may receive the sensor output and may control the motor which drives the rear-wheel steering system.

The mobile member 120 is provided in the accommodation space of the housing 100 and at least a part thereof extends from the housing 100 and is connected to the linear sensor mounting unit shown in FIG. 1.

The magnet member 122 is provided in the mobile member 120, generates a magnetic force, and interacts with switch units (not shown) to generate the sensor output in the output unit 110.

As shown in FIG. 2, as the lead screw moves in the controllable area inside the housing which accommodates the motor, the mobile member 120 of the linear sensor which interworks with the lead screw moves left and right in a stroke section a. When the lead screw is out of the controllable area, the mobile member 120 of the linear sensor moves beyond the stroke section a and is located in over stroke sections b and c.

According to the embodiment of the present invention, a position of the linear sensor may be detected in the stroke section a and the over stroke sections b and c and the output unit 110 may generate the sensor output. Accordingly, even when the linear sensor is in the over stroke sections b and c, that is, the lead screw is out of the controllable area, the controller which receives the sensor output from the output unit 110 may detect the position.

As shown in FIG. 2, the stroke section a includes preliminary sections A at both ends. Since the preliminary sections A are in contact with the over stroke sections b and c, the mobile member 120 of the linear sensor enters the preliminary sections A before entering the over stroke sections b and c.

Figure 3:
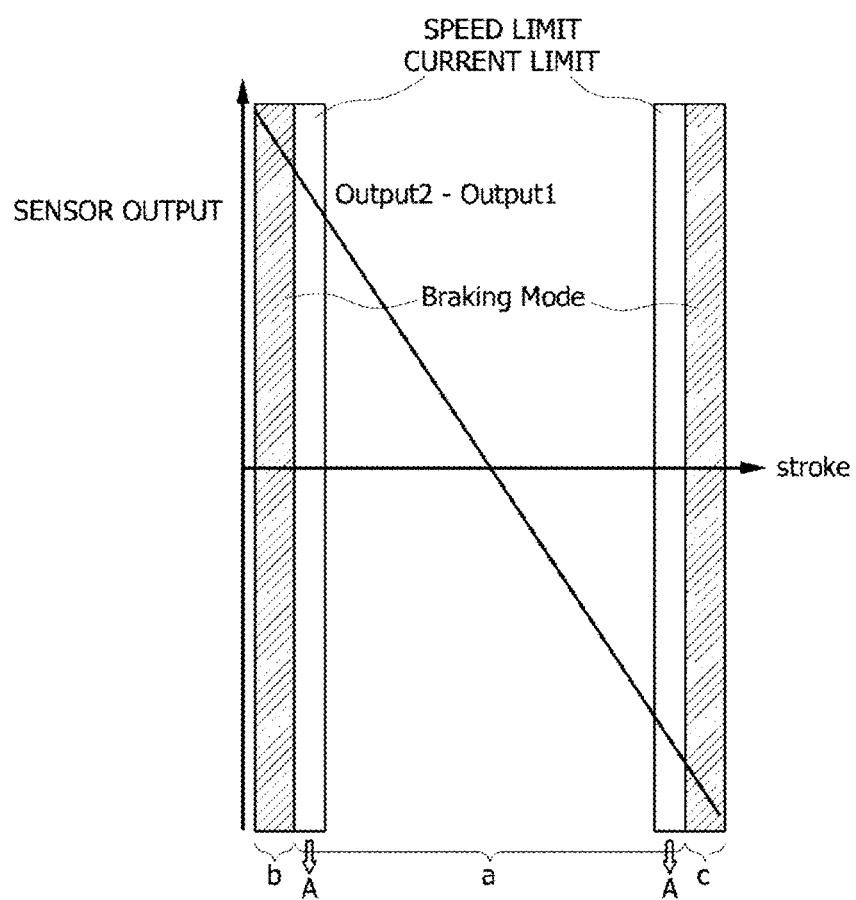
FIG. 3 is a graph illustrating a stroke section and over stroke sections of the linear sensor according to another embodiment of the present invention.
Figure 4:
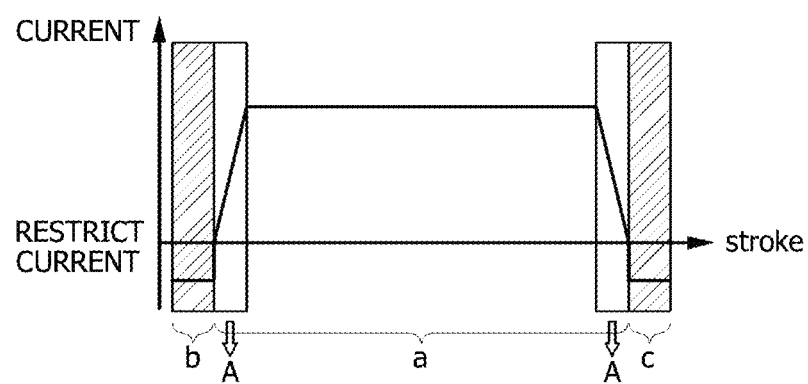
FIG. 4 is a graph illustrating changes in current supplied to a motor according to one embodiment of the present invention.
Figure 5:
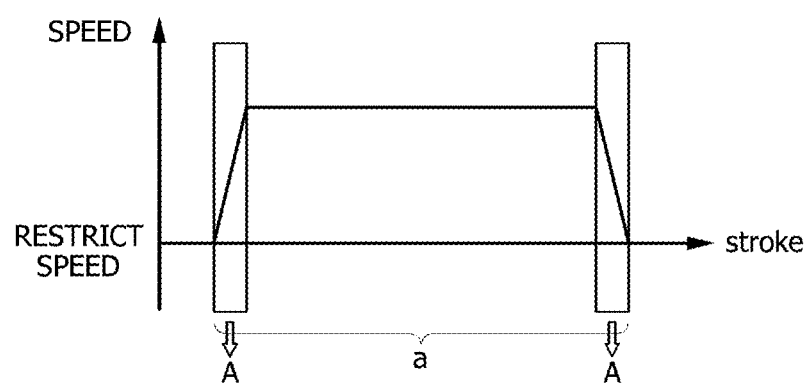
FIG. 5 is a graph illustrating changes in a rotational speed of the motor according to one embodiment of the present invention.

FIG. 3 is a graph illustrating the stroke section a and the over stroke sections b and c of the linear sensor according to another embodiment of the present invention. FIG. 4 is a graph illustrating changes in current supplied to the motor according to one embodiment of the present invention. FIG. 5 is a graph illustrating changes in a rotational speed of the motor according to one embodiment of the present invention.

Referring to FIGS. 3 to 5, a method of preventing over stroke in the rear-wheel steering system according to one embodiment of the present invention will be described as follows.

It is determined whether the linear sensor which interworks with the lead screw enters the preliminary sections A of the stroke section a (S1).

As described above, the linear sensor includes the first sensor output and the second sensor output. In another embodiment of the present invention, the controller may detect a position of the mobile member 120 of the linear sensor using a difference between the second sensor output and the first sensor output. As shown in FIG. 3, the resolution of the sensor output increases two times by using the difference in such a way that the position of the lead screw in the motor housing may be more precisely detected through the position of the linear sensor.

Next, when the linear sensor enters the preliminary sections A, the movement of the lead screw is restricted (S2).

As shown in FIG. 3, the preliminary sections A are sections set with one of a rotational speed of the motor which allows the lead screw to linearly move and a critical point of the current supplied to the motor. In other words, the preliminary sections A in which the mobile member 120 of the linear sensor is located correspond to the ends of the controllable area of the lead screw.

As shown in FIGS. 4 and 5, when the controller senses that the linear sensor enters the preliminary sections A through a signal of the output unit 110 of the linear sensor, the controller may reduce one of a speed of the motor connected to the lead screw or the current supplied to the motor, thereby preventing the lead screw from being out of the controllable area.

After that, it is determined whether the linear sensor moves beyond the preliminary sections A and enters the over stroke sections b and c (S3). Referring to FIG. 3, the over stroke sections b and c are sections to brake the motor connected to the lead screw.

After that, when the linear sensor enters the over stroke sections b and c, a moving direction of the lead screw is switched (S4).

The controller senses that the mobile member 120 of the linear sensor enters the over stroke sections b and c through the output signal of the output unit 110 generated by an interaction between the magnet member 122 and the switch units. Here, referring to FIG. 4, the controller changes a polarity of the current supplied to the motor connected to the lead screw, thereby braking the motor.

As described above, according to the embodiments of the present invention, a linear sensor which interworks with a lead screw and is capable of detecting a position of the lead screw in a left-right movement area is included, thereby whether the lead screw is present in a controllable area in the left-right movement area can be indirectly detected to control the lead screw.

Also, when the linear sensor enters preliminary sections, a controller controls one of a rotational speed of a motor and a current supplied to the motor, thereby the lead screw can be prevented from being out of the controllable area.

Also, when the linear sensor enters an over stroke section, the controller changes a polarity of the current supplied to the motor, thereby the lead screw can be allowed to return to the controllable area from the outside of the controllable area.

Also, the controller detects a position of the linear sensor through a difference between a first sensor output and a second sensor output of the linear sensor, thereby resolution can be increased to improve the accuracy of detecting the position of the lead screw.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of preventing over stroke in a rear-wheel steering system, comprising:
   determining whether a linear sensor which moves in conjunction with a lead screw enters preliminary sections A of a stroke section a; and
   restricting the movement of the lead screw when the linear sensor enters the preliminary sections A.

2. A method of preventing over stroke in a rear-wheel steering system, comprising:
   determining whether a linear sensor which moves in conjunction with a lead screw enters preliminary sections A of a stroke section a;
   restricting the movement of the lead screw when the linear sensor enters the preliminary sections A
   determining whether the linear sensor moves beyond the preliminary sections A and enters over stroke sections b and c; and
   switching a moving direction of the lead screw when the linear sensor enters the over stroke sections b and c.

3. The method of claim 2, wherein the linear sensor has a first sensor output and a second sensor output, and
   wherein a controller uses a difference between the first sensor output and the second sensor output in the determining of entry.

4. The method of claim 1, wherein a controller, in the restricting of the movement, reduces a speed of a motor connected to the lead screw.

5. The method of claim 1, wherein a controller, in the restricting of the movement, reduces current supplied to a motor connected to the lead screw.

6. The method of claim 2, wherein a controller, in the switching of the moving direction, changes a polarity of current supplied to a motor connected to the lead screw.

7. A linear sensor comprising:
   a housing comprising an accommodation space therein;
   a mobile member which is provided in the accommodation space, at least a part thereof extending outside the housing and connected to a mounting unit, interworks with a lead screw, and moves left and right in a stroke section a;
   a magnet member provided in the mobile member and configured to generate a magnetic force; and
   an output unit configured to sense a position of the magnet member and to generate a first sensor output and a second sensor output.

8. The linear sensor of claim 7, wherein when the mobile member enters preliminary sections A in the stroke section a, the movement of the lead screw is restricted.

9. The linear sensor of claim 8, wherein when the mobile member moves beyond the preliminary sections A and enters over stroke sections b and c, a moving direction of the lead screw is switched.

10. The linear sensor of claim 7, wherein a position of the mobile member 120 is sensed based on a difference between the first sensor output and the second sensor output.

* * * * *